United States Patent
Kiyohara

(10) Patent No.: US 8,616,756 B2
(45) Date of Patent: Dec. 31, 2013

(54) DISPLAY DEVICE

(75) Inventor: Toru Kiyohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 629 days.

(21) Appl. No.: 12/345,927

(22) Filed: Dec. 30, 2008

(65) Prior Publication Data
US 2009/0180244 A1  Jul. 16, 2009

(30) Foreign Application Priority Data

Jan. 10, 2008  (JP) .................................. 2008-003091

(51) Int. Cl.
F21V 7/04  (2006.01)
(52) U.S. Cl.
USPC ........................................... 362/633; 349/58
(58) Field of Classification Search
USPC ................ 362/559, 560, 561, 632, 633, 634; 349/56, 57, 58, 59, 60, 62, 64, 65, 69, 349/70
See application file for complete search history.

(56) References Cited

U.S. PATENT DOCUMENTS

| | | | |
|---|---|---|---|
| 5,808,707 A * | 9/1998 | Niibori et al. ................... | 349/60 |
| 6,191,838 B1 * | 2/2001 | Muramatsu ................... | 349/149 |
| 6,229,695 B1 * | 5/2001 | Moon ........................ | 361/679.3 |
| 6,888,591 B2 * | 5/2005 | Kim ................................ | 349/58 |
| 7,006,167 B2 * | 2/2006 | Kashimoto ..................... | 349/58 |
| 7,012,655 B2 * | 3/2006 | You et al. ......................... | 349/12 |
| 7,528,898 B2 * | 5/2009 | Hashimoto ..................... | 349/58 |
| 7,750,992 B2 * | 7/2010 | Kang et al. ...................... | 349/60 |
| 2008/0002091 A1 * | 1/2008 | Son et al. ........................ | 349/58 |

FOREIGN PATENT DOCUMENTS

| | | |
|---|---|---|
| JP | 7-160423 | 6/1995 |
| JP | 10-73805 | 3/1998 |
| JP | 2000-66178 | 3/2000 |
| JP | 2001-13886 | 1/2001 |
| JP | 2001-154802 | 6/2001 |
| JP | 2001-183633 | 7/2001 |
| JP | 2003-233059 | 8/2003 |
| JP | 2006-58637 | 3/2006 |
| JP | 2007-65855 | 3/2007 |

OTHER PUBLICATIONS

Japanese Office Action issued Dec. 27, 2011 in patent application No. 2008-003091 with English translation.

* cited by examiner

*Primary Examiner* — Hargobind S Sawhney
(74) *Attorney, Agent, or Firm* — Oblon, Spivak, McClelland, Maier & Neustadt, L.L.P.

(57) ABSTRACT

A display device includes a touch panel includes a projection on the upper part of a front frame for holding a display element. The inner side face of the projection is opposed to the side part of the touch panel. The side part of the touch panel comes into contact with the inner side face of the projection thus positioning the touch panel into a desired position.

4 Claims, 5 Drawing Sheets

DISPLAY DEVICE

This application claims priority from Japanese Patent Application No. 2008-003091 filed on Jan. 10, 2008, the entire subject matter of which is incorporated herein by reference.

BACKGROUND OF THE INVENTION

1. Field of the Invention

The present invention relates to a display device equipped with a touch panel.

2. Description of the Related Art

JP-A-2001-154802 (Pages 2-3, FIGS. 1-3) discloses a related art display device having a liquid crystal display unit to which a related art touch panel and a liquid crystal display are fixed, wherein the display device positions and fixes the touch panel by interposing a cabinet and arranging projections for positioning in a plurality of sections on the surface to which the touch panel of the cabinet is placed and fixed. Further, JP-A-10-73805 (Pages 2-3, FIG. 1) discloses a related art liquid crystal display device in which the periphery of the rear surface of a touch panel is bonded to the stepped part of a case and the touch panel is accommodated in the case.

The related art display device disclosed by JP-A-2001-154802 arranges a cabinet as a fixing member including a plurality of projections for determining the touch panel placing positions on the front surface and bosses for fixing the liquid crystal on the rear surface. The number of parts increases by interposing the cabinet. The positions of the touch panel and the display device are displaced from each other and normal operation is hampered in the peripheral area of the display region. The related art liquid crystal display device disclosed by JP-A-10-73805 includes a touch panel while arranging a stepped part on a case for accommodating a touch panel in order to keep away a liquid crystal display panel so as not to apply pressure of the user's push on the touch panel to the liquid crystal display panel. This presents a problem of difficulty in holding (fixing) a liquid crystal display panel and thus assembling the liquid crystal display panel.

SUMMARY OF THE INVENTION

The invention has been accomplished to solve the above problems and provides a display device equipped with a touch panel for preventing the touch panel from being displaced from the display device and from being inoperable normally in the periphery of a display region. The invention provides a display device that is easy to assemble when mounting a touch panel.

A display device according to the invention comprises: a backlight held by a rear frame and irradiating light; a front frame for holding a display element arranged on the light-irradiating face of the backlight, the front frame including an opening; and a touch panel arranged on the upper part of the front frame; characterized in that the front frame includes a projection coming into contact with the side part of the touch panel.

According to the inventive display device, it is possible to prevent the touch panel from being displaced from the display device and from being inoperable normally in the periphery of the display region of the display device. It is also possible to provide a display device that is easy to assemble when mounting a touch panel.

DETAILED DESCRIPTION OF THE PREFERRED EMBODIMENTS

The configuration of a display device according to an embodiment of the invention will be described based on figures. A component having the same sign in each figure indicates virtually the same configuration.

Embodiment 1

Figure 1:
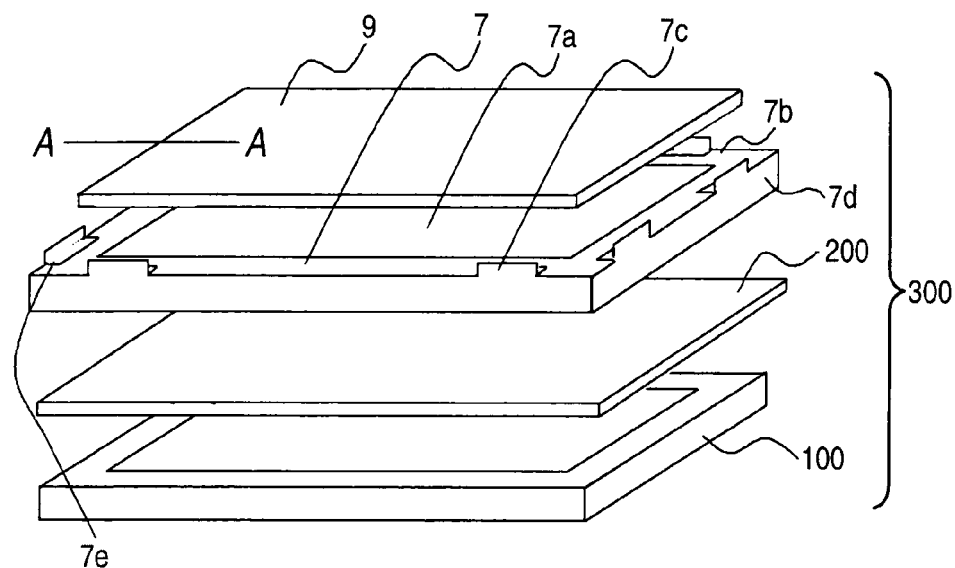
FIG. 1 is an exploded perspective view of a display device according to Embodiment 1 of the invention.
Figure 2:
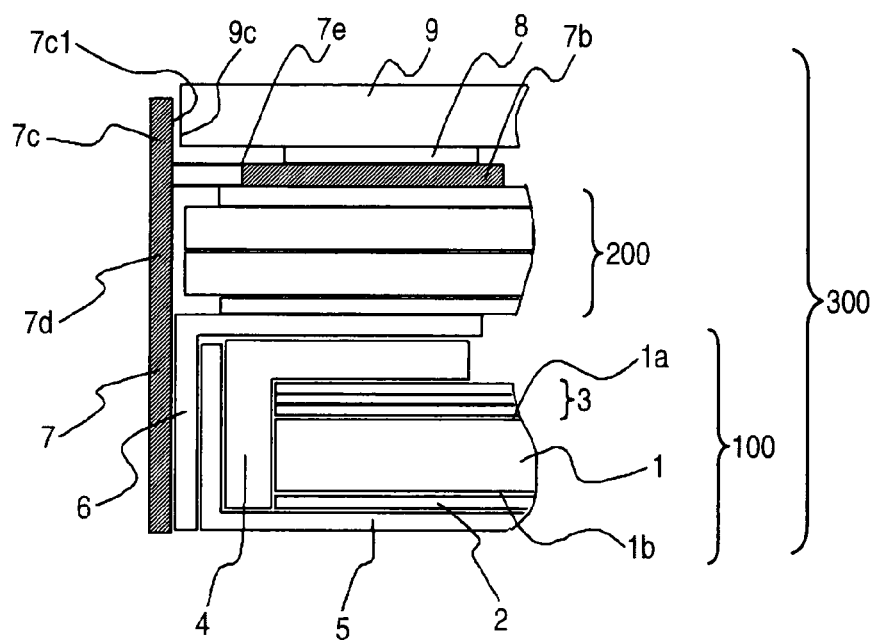
FIG. 2 is a partial cross-sectional view of a display device according to Embodiment 1 of the invention.

FIG. 1 is an exploded perspective view of a display device according to the invention. FIG. 2 is a partial cross-sectional view of the display device shown in FIG. 1 in the assembled state along the line A-A.

As shown in FIGS. 1 and 2, a display device 300 equipped with the inventive touch panel comprises a backlight 100, a display element 200 for irradiating light from the backlight 100 and touch panel 9 mounted on the display element 200.

There are arranged a light guide plate 1 for propagating light incident from a light source in a planar shape and irradiating the light from a light-irradiating face 1a, a reflective sheet 2 for returning the light irradiated from the light guide plate 1 onto the rear face 1b of the light guide plate 1 opposite to the light-irradiating face 1a of the light guide plate 1, and an optical sheet 3 on the light-irradiating face 1a of the light guide plate 1. These components are accommodated in a resin frame 4 arranged from the light-irradiating face 1a and a rear frame 5 arranged from the rear face 1b of the light guide plate 1. Further, a middle frame 6 is arranged from the light-irradiating face 1a of the light guide plate 1. These components constitute a backlight 100. A display element 200 such as a liquid crystal display panel is arranged on the light-irradiating face of the backlight 100. A front frame 7 including an opening 7a holds the display element 200 and the backlight 100. A touch panel 9 is mounted on the upper part 7b of the front frame 7 via an adhesive material 8 such as a double-faced tape. These components constitute a display device 300 equipped with a touch panel 9.

The upper part 7b of the front frame 7 holding the display element 200 includes at least one projection 7c. The projection 7c is formed by cutting a tooth 7e in a portion of the upper part 7b of the front frame 7 and raising the tooth 7e. In this embodiment 1, the projection 7c is formed into a shape where the side part 7d of the front frame 7 is extended. The projection 7c is formed so as to be opposed to the rectangular touch panel 9. The projection 7c is formed so that its height will be smaller than the height of the touch panel 9.

Next, the procedure for mounting the touch panel 9 onto the upper part 7b of the front frame 7 will be described. The touch panel 9 is mounted on the front frame 7 so that the inner side face 7c1 of the projection 7c will be opposed to the side part 9c of the touch panel 9. The side part 9c of the touch panel 9 comes into contact with the inner side face 7c1 of the projection 7c thus positioning the touch panel 9 into a desired position. Next, the touch panel 9 is fixed to a desired position by using an adhesive material 8 such as a double-faced tape interposed between the upper part 7b of the front frame 7 and the touch panel 9.

In Embodiment 1 of the invention, the projections 7c are formed in two positions of each side of the front frame 7, in total eight positions, opposed to the side part 9c of the touch panel 9. It is possible to position the touch panel 9 in a single direction by forming the projection 7c at least in one position of the front frame 7 opposed to the side part 9c of the touch panel 9. It is possible to correctly position the touch panel 9 in a desired position of the upper part 7b of the front frame 7 by forming at least one projection 7c in each of the positions opposed to two side parts of the touch panel 9 adjacent to each other (in two directions, an X direction or a horizontal direction and a Y direction or a vertical direction). Further, it is possible to suppress movement of the touch panel 9 mounted on the front frame 7 by forming at least one projection 7c in each of the positions opposed to four side parts of the touch panel 9.

As described above, the display device 300 equipped with the touch panel 9 according to the invention includes a projection 7c formed on the upper part 7b of the front frame 7 for holding a display element 200. The side part 9c of the touch panel 9 comes into contact with the inner side face 7c1 of the projection 7c to allow positioning of the touch panel 9 thus suppressing movement of the effective operation area of the touch panel 9 with respect to the display region of the display device 300. This prevents a problem that the touch panel 9 is displaced from the display device 300 thus disabling the normal operation in the periphery of the display region of the display device 300. The touch panel 9 may be positioned by bringing the touch panel 9 into contact with the projection 7c, thereby providing an easy-to-assemble display device. The projection 7c for positioning is arranged on the front frame 7 of the display device 300. This allows positioning of the touch panel 9 without increasing the number of parts.

The tooth 7e is cut into the upper part 7b of the front frame 7 and the tooth 7e is raised, which provides a narrow frame. The projection 7c is formed into a lower shape than the touch panel 9 and is thus easy to assemble thereby preventing an increase in the thickness of the display device 300.

The shape of the projection 7c may be appropriately specified, such as a rectangular shape shown in FIG. 1, a triangular shape or an arc shape. The location where the projection 7c is arranged may be changed as long as the above object is attained. It is possible to set a location of the projection 7c in accordance with the size and shape of the touch panel 9.

Figure 3:
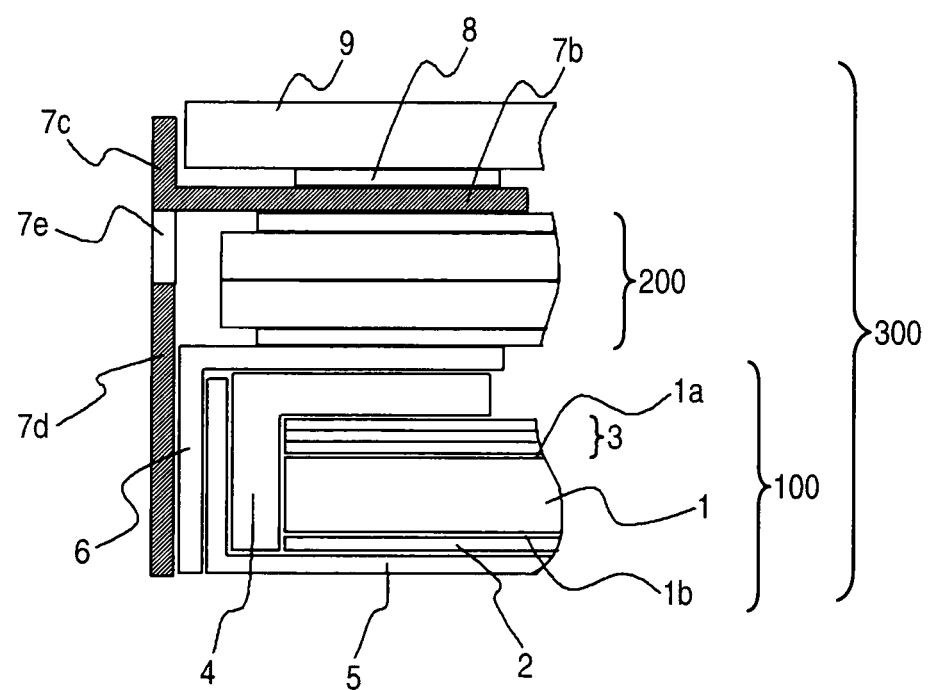
FIG. 3 is a partial cross-sectional view of a display device according to Embodiment 1 of the invention.

FIG. 3 shows a display device according to a variant of Embodiment 1. In FIG. 3, the projection 7c may have the shape of a tooth 7e formed by cutting in a portion of the side part 7d instead of the upper part 7b and then raised. Even in case the upper part 7b of the front frame 7 is narrow and a projection 7c is hard to form, it is possible to form a projection 7c having the shape of a tooth 7e formed by cutting in the side part 7d and then raised.

While the front frame 7 is formed of an alloy material such as stainless steel or an aluminum alloy, the front frame 7 may be formed of a synthetic resin such as ABS. In case the front frame 7 is formed of a synthetic resin, the weight of the display device 300 may be reduced. The middle frame 6 is formed of an alloy material such as stainless steel or an aluminum alloy. The resin frame 4 is formed of synthetic resin such as a polycarbonate (PC) or ABS. A material of high reflectivity may be used as a material of the resin frame 4 or a white paint may be applied to the resin frame 4 thus desirably reducing the losses of light irradiated from a light source. Use of polycarbonate containing glass fibers preferably reduces the variations in the shape caused by shrinkage of resin under low temperatures.

The light guide plate 1 may be formed of an acrylic resin as well as polycarbonate (PC) or a cycloolefin resin. Use of polycarbonate (PC) or a cycloolefin resin reduces variations in the dimensions caused by a change in the temperature and the light guide plate 1 may be used in a wider temperature range. The optical sheet 3 may be a diffusion sheet, a prism sheet, a reflective sheet or a polarization reflective sheet. Depending on a desired characteristic, any one of these sheets or at least one of the combinations thereof may be used as an optical sheet 3. Or, the optical sheet 3 may be omitted depending on a case.

The light source (not shown) of the backlight 100 may be an array of point sources such as cold-cathode tubes or Light Emitting Diodes (LEDs). While a liquid crystal panel is used as a display element 200 in this embodiment, the invention is not limited thereto but a Plasma Display Panel (PDP) or a display panel of the Electro Luminescence (EL) system provides a similar working effect.

While this embodiment describes an exemplary display device 300 equipped with a touch panel 9, a display device 300 may have a protective plate bonded thereto such as glass or transparent resin to protect the display element 200 instead of the touch panel 9. By using the arrangement of this embodiment in the positioning of a protective plate, the positioning is made easy. Through anti-reflection processing on the protective plate such as glass or transparent resin, it is possible to enhance the visibility of the display device 300 in the outdoor environment or the like.

Embodiment 2

Figure 4:
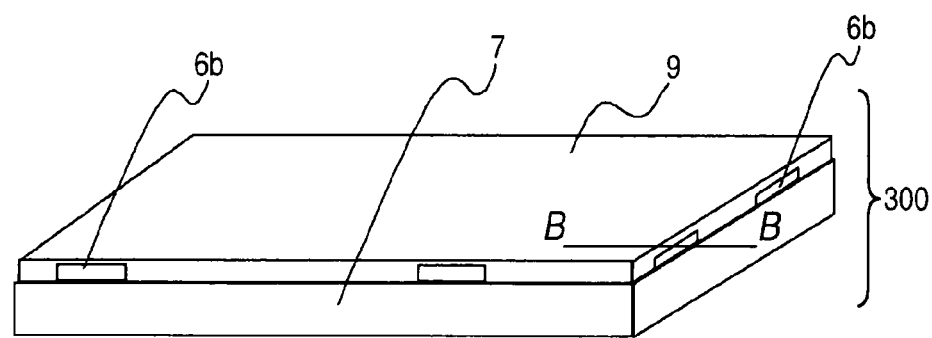
FIG. 4 is a perspective view of a display device according to Embodiment 2 of the invention.
Figure 5:
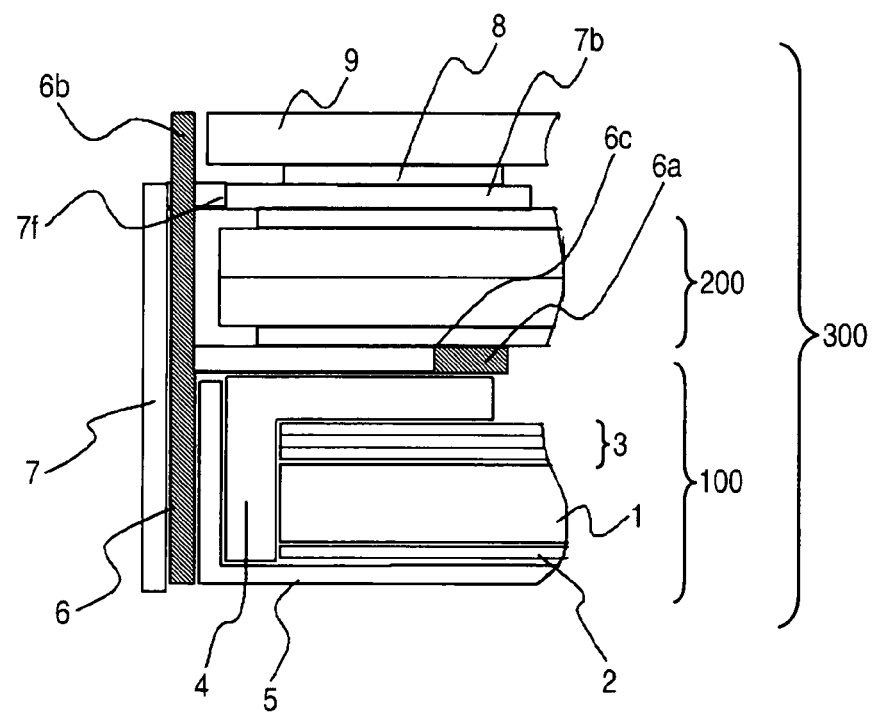
FIG. 5 is a partial cross-sectional view of a display device according to Embodiment 2 of the invention.

FIG. 4 is a perspective view of a display device according to another embodiment of the invention. FIG. 5 is a partial cross-sectional view of the display device shown in FIG. 4 along the line B-B. While the front frame 7 is provided with a projection 7c for positioning of the touch panel 9 in Embodiment 1, a projection 6b is arranged on the upper part 6a of the middle frame 6 and the projection 6b formed on the middle frame 6 protrudes from a hole 7f formed in the front frame 7 to allow positioning of the touch panel 9 as shown in FIGS. 4 and 5 in Embodiment 2. The positions and number of the projections 6b and other arrangements are same as those in Embodiment 1. The hole 7f through which the projection 6b provided on the front frame 7 passes may be a notch.

In FIG. 5, the projection 6b provided on the middle frame 6 has a shape where a tooth 6c is cut into the upper part 6a of the middle frame and the tooth 6c is raised, same as Embodiment 1. The side part of the touch panel 9 comes into contact with the projection 6b to allow positioning of the touch panel 9. Moreover, the side part of the display element 200 comes into contact with the projection 6b to allow positioning of the display element 200. In this way, the same member may be used to perform positioning of the touch panel 9 and the display element 200. This reliably suppresses displacement of the display region of the display element 200 from the operating region of the touch panel 9 thus providing a display device 300 free from displacement of the display region of the display element 200 from the operating region of the touch panel 9.

Embodiment 3

Figure 6:
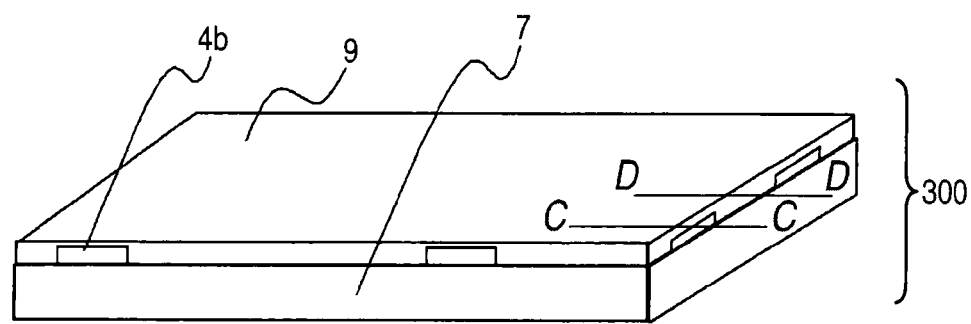
FIG. 6 is a perspective view of a display device according to Embodiment 3 of the invention.
Figure 7:
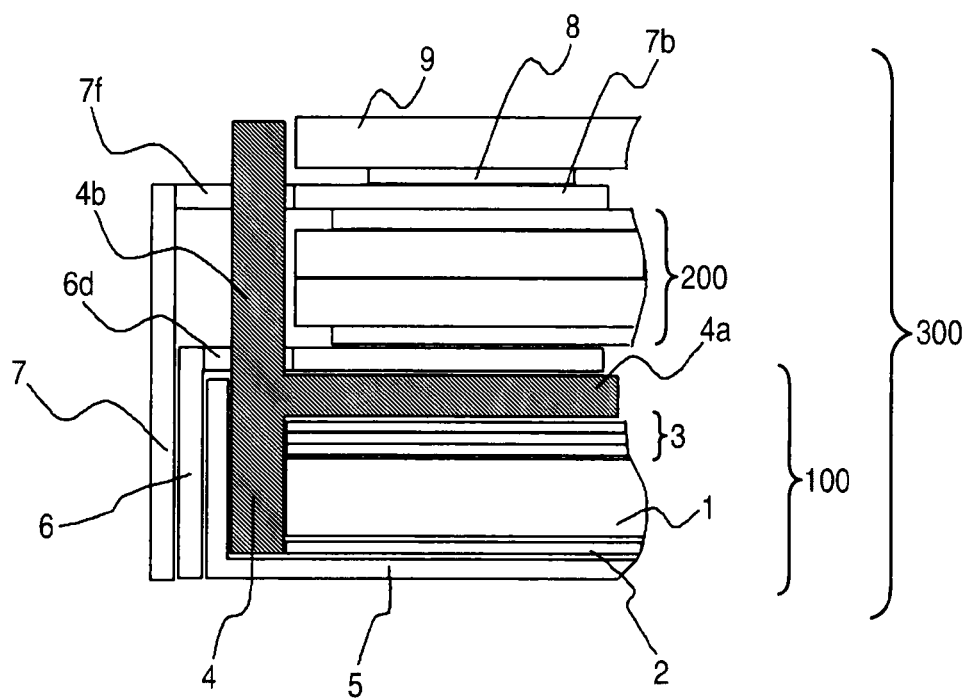
FIG. 7 is a partial cross-sectional view of a display device according to Embodiment 3 of the invention.

FIG. 6 is a perspective view of a display device according to another embodiment of the invention. FIG. 7 is a partial cross-sectional view of the display device shown in FIG. 6 along the line C-C. While a projection for positioning of the touch panel 9 is arranged respectively on the front frame 7 and the middle frame 6 in Embodiment 1 and Embodiment 2, a projection 4b is arranged on the upper part 4a of a resin frame 4 as shown in FIGS. 6 and 7 in Embodiment 3. The projection 4b protrudes from a hole 7f in the front frame 7 and a hole 6d in the middle frame 6 to come into contact with the side part of the touch panel 9 thus allowing positioning of the touch panel. The positions and number of the projections 4b and other arrangements are same as those in Embodiments 1 and 2. The hole 7f and the hole 6d through which the projection 4b provided on the front frame 7 and the middle frame 6 pass may be a notch.

The projection 4b arranged on the resin frame 4 is molded so as to protrude from the upper part 4a of the resin frame 4. The side part of the touch panel 9 comes into contact with the projection 4b to allow positioning of the touch panel 9. Further, the side part of the display element 200 comes into contact with the projection 4b to allow positioning of the display element 200. The resin frame 4 comes into contact with the side part of each of the members constituting the backlight 100 such as the light guide plate 1, the reflective sheet 2 and the optical sheet 3 to allow positioning of the members. It is thus possible to perform positioning of almost all the members constituting the display device 300 thus providing an easy-to assemble display device 300.

Figure 8:
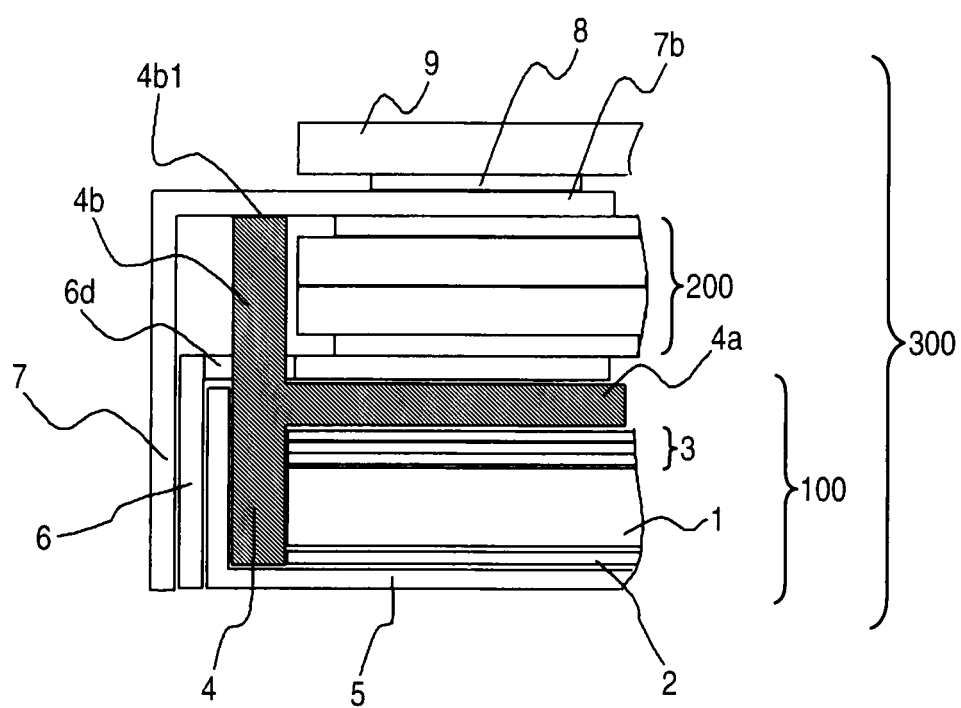
FIG. 8 is a partial cross-sectional view of a display device according to Embodiment 3 of the invention.

FIG. 8 is a partial cross-sectional view of the display device shown in FIG. 6 along the line D-D. The upper surface part 4b1 of the protrusion 4b formed on the resin frame 4 of the display device 300 that does not protrude from the hole in the front frame 7 comes into contact with the front frame 7. With this arrangement, it is possible to keep constant the clearance between the display element 200 and the front frame 7 to prevent the pressing force of operating the touch panel 9 from being applied to the display element 200. This holds the display element 200 without keeping away the display element 200.

What is claimed is:

1. A display device comprising:
   a first frame;
   a backlight accommodated in the first frame;
   a second frame for holding the backlight and a display element arranged on the light-irradiating face of the backlight, the second frame including an opening and composed of an upper part and a side part; and
   a touch panel arranged on the upper part of the second frame,
   wherein the first frame includes a projection coming into contact with a side part of the touch panel, and
   wherein the second frame includes a hole or a notch through which the projection of the first frame passes.

2. The display device according to claim 1,
   wherein the projection has a shape where a tooth cut into a portion of the upper part of the first frame is raised.

3. The display device according to claim 1,
   wherein the projection has a shape where a tooth cut into a portion of the side part of the first frame is raised.

4. The display device according to claim 1,
   wherein the projection protrudes from the upper part of the first frame.

* * * * *